US012110634B2

(12) United States Patent
McIntyre et al.

(10) Patent No.: US 12,110,634 B2
(45) Date of Patent: *Oct. 8, 2024

(54) TREATED TITANIUM DIOXIDE PIGMENT, PROCESS OF MAKING THEREOF AND USE THEREOF IN PAPER MANUFACTURE

(71) Applicant: TRONOX LLC, Oklahoma City, OK (US)

(72) Inventors: Robert McIntyre, Louth (GB); Julie Elizabeth Kerrod, Lincolnshire (GB); Ben Webber, Grimsby (GB); Neil Burniston, Brigg (GB)

(73) Assignee: Tronox LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/253,404

(22) PCT Filed: Jun. 19, 2019

(86) PCT No.: PCT/US2019/037917
§ 371 (c)(1),
(2) Date: Dec. 17, 2020

(87) PCT Pub. No.: WO2019/246209
PCT Pub. Date: Dec. 26, 2019

(65) Prior Publication Data
US 2021/0262171 A1    Aug. 26, 2021

Related U.S. Application Data

(60) Provisional application No. 62/686,829, filed on Jun. 19, 2018, provisional application No. 62/686,840, filed on Jun. 19, 2018.

(51) Int. Cl.
*D21H 21/28* (2006.01)
*C09C 1/36* (2006.01)
(Continued)

(52) U.S. Cl.
CPC ......... *D21H 21/285* (2013.01); *C09C 1/3661* (2013.01); *C09C 3/063* (2013.01);
(Continued)

(58) Field of Classification Search
CPC .............. C01P 2002/54; C01P 2004/03; C01P 2004/04; C01P 2004/80; C01P 2004/84;
(Continued)

(56) References Cited

U.S. PATENT DOCUMENTS 3,103,473 A    9/1963  Juda
3,505,772 A    4/1970  De Claire et al.
(Continued)

FOREIGN PATENT DOCUMENTS

CN    103113762    5/2013
EP    1989264    9/2012
(Continued)

OTHER PUBLICATIONS

Chinese Office Action mailed in corresponding Chinese Appln. No. 201980048309.9 on Aug. 3, 2021, pp. 1-9.
(Continued)

*Primary Examiner* — Shuangyi Abu Ali
(74) *Attorney, Agent, or Firm* — McAfee & Taft

(57) ABSTRACT

Process for the surface treatment of a titanium dioxide pigment, characterized in that it comprises the following steps: an aqueous suspension of titanium dioxide pigments is formed, in a first step, a layer of alumina phosphate is precipitated on the surface of the pigment, in a second step, a layer of alumina is precipitated over the first layer of alumina phosphate, and in an optional third step, a layer of magnesium oxide is precipitated on the layer of alumina. Titanium dioxide pigments made by the disclosed process and method using said pigments in paper manufacturing are also disclosed.

4 Claims, 7 Drawing Sheets

| Optional Magnesium Oxide layer |
| High Surface Area Alumina layer |
| Aluminum Phosphate layer |
| Titanium Dioxide |

(51) Int. Cl.
*C09C 3/06* (2006.01)
*D21H 17/00* (2006.01)
*D21H 17/67* (2006.01)
*D21H 17/69* (2006.01)

(52) U.S. Cl.
CPC .......... *D21H 17/675* (2013.01); *D21H 17/69* (2013.01); *D21H 17/73* (2013.01); *C01P 2004/03* (2013.01); *C01P 2004/04* (2013.01); *C01P 2004/80* (2013.01); *C01P 2004/84* (2013.01); *C01P 2006/12* (2013.01)

(58) Field of Classification Search
CPC ... C01P 2006/12; C09C 1/3661; C09C 3/063; D21H 17/675; D21H 17/69; D21H 17/73; D21H 21/285
See application file for complete search history.

(56) References Cited

U.S. PATENT DOCUMENTS

| | | | |
|---|---|---|---|
| 3,523,809 A | | 8/1970 | Holbein |
| 3,853,575 A | | 12/1974 | Holle et al. |
| 4,400,365 A | | 8/1983 | Haacke et al. |
| 5,114,486 A | | 5/1992 | Demosthenous et al. |
| 5,665,466 A | * | 9/1997 | Guez ................ C09C 1/3661 106/443 |
| 5,942,281 A | | 8/1999 | Guez et al. |
| 7,824,486 B2 | | 11/2010 | Thiele |
| 7,842,131 B2 | | 11/2010 | Blumel et al. |
| 8,641,870 B2 | | 2/2014 | Jurgens et al. |
| 11,371,190 B2 | | 6/2022 | McIntyre et al. |
| 2005/0011408 A1 | | 1/2005 | Drews-Nicolai et al. |
| 2007/0175363 A1 | | 8/2007 | Blumel et al. |
| 2021/0292569 A1 | | 9/2021 | Mcintyre et al. |

FOREIGN PATENT DOCUMENTS

| | | |
|---|---|---|
| GB | 1368601 | 10/1974 |
| JP | S49-008018 | 1/1974 |
| JP | H08225323 A | 9/1996 |
| JP | 2000136497 A | 5/2000 |
| JP | 2006528249 A | 12/2006 |
| JP | 2009525367 A | 7/2009 |
| WO | 2005/017049 A1 | 2/2005 |
| WO | 2014078040 A1 | 5/2014 |
| WO | 2019/246226 A1 | 12/2019 |

OTHER PUBLICATIONS

PCT International Search Report & Written Opinion mailed in corresponding PCT Application No. PCT/US2019/037917 on Aug. 22, 2019, pp. 1-8.
Japanese Office Action mailed in corresponding Japanese Appln. No. 2020-571358 on Jan. 25, 2022.
Chinese Office Action mailed in corresponding Chinese Application No. 201980048225.5 on Jun. 11, 2021, pp. 1-12.
PCT International Search Report and Written Opinion mailed in corresponding PCT Application No. PCT/JS2019/037937 on Sep. 12, 2019, pp. 1-9.
Chinese Office Action mailed in corresponding Chinese Application No. 201980048225.5 on Dec. 8, 2021.
European Search Report mailed in corresponding European Application No. 19823112.8 on Apr. 2, 2022.
Indian Office Action mailed in corresponding Indian Application No. 202017054059 on Mar. 19, 2021.
Japanese Office Action mailed in corresponding Japanese Application No. 2020-571544 on Jan. 25, 2022.
Chinese Office Action mailed in corresponding Chinese Application No. 201980048309.9 on Jan. 19, 2022.
Search Report issued in corresponding European Application No. 19823606.9, dated Mar. 2, 2022.
Office Action issued in corresponding Japanese Application No. 2020571358, dated Jan. 25, 2022.
Examiner's Requisition issued in corresponding Canadian Patent Application No. 3,104,474, dated Mar. 25, 2022.
Office Action issued in corresponding Japanese patent application No. JP 2020-571358, dated Mar. 4, 2022.
Office Action Issued in corresponding Japanese patent application No. JP 2020-571358, dated Sep. 13, 2022.

* cited by examiner

| Optional Magnesium Oxide layer |
| High Surface Area Alumina layer |
| Aluminum Phosphate layer |
| Titanium Dioxide |

FIG. 1

FIG. 2 (Comparative)

FIG. 3 (Comparative)

FIG. 5 (Comparative)

Example 1 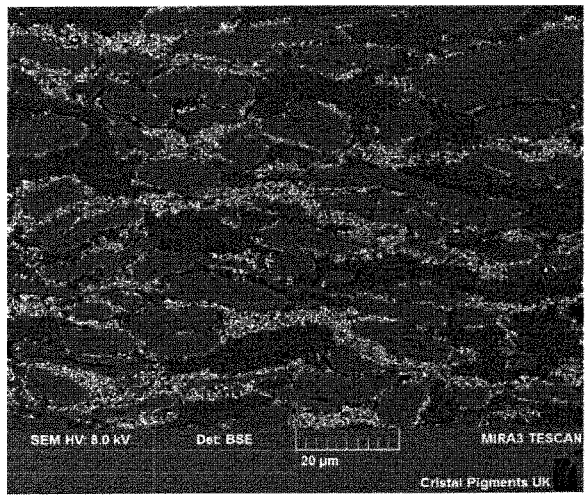 Benchmark 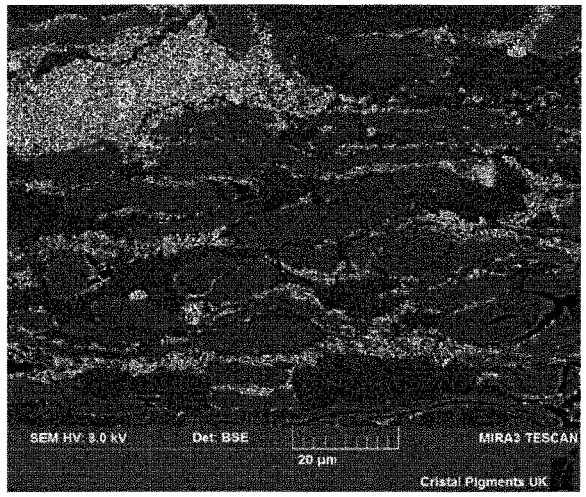
FIG. 7

TREATED TITANIUM DIOXIDE PIGMENT, PROCESS OF MAKING THEREOF AND USE THEREOF IN PAPER MANUFACTURE

CROSS REFERENCE TO RELATED APPLICATION

This application claims the benefit of U.S. Provisional Patent Application No. 62/686,840 filed on Jun. 19, 2018, and U.S. Provisional Patent Application No. 62/686,829 filed on Jun. 19, 2018, both of which are hereby incorporated by reference.

FIELD OF THE INVENTION

The present invention relates to a titanium dioxide pigment, a process for the surface treatment of a titanium dioxide pigment, and the use of the titanium dioxide pigment in paper manufacture.

BACKGROUND

It is known that titanium dioxide, either in rutile or anatase form, may be used advantageously as an opacifying pigment in paper manufacture. This is because titanium dioxide is a white pigment which has a high refractive index; it is among the compounds which, for an optimum particle size (generally 0.2 to 0.3 µm), best diffuse light.

The incorporation of titanium dioxide into paper usually consists in mixing the titanium dioxide with cellulose fibers which are predispersed in water. More or less efficient binding by electrostatic attraction between the cellulose fiber and the titanium dioxide particles can then take place. The cellulose fiber is by nature negatively charged.

The opacity of the paper pigmented with titanium dioxide depends in particular on the titanium dioxide content of the paper, it is thus a function of the level of binding to the cellulose fibers and the physicochemical retention of the titanium dioxide. However, while retention is an important property for opacity, also important is the level of dispersion of the pigment along the paper fibers.

Previously, titanium dioxides used as opacifying pigments had insufficient physicochemical retention. The problem of insufficient physicochemical retention was solved in U.S. Pat. No. 5,665,466, which referred to a titanium dioxide pigment for paper manufacture formed by a multi-step process comprising coating a titanium dioxide core successively with at least a layer of aluminium phosphate, followed by a layer of alumina. Optionally, the alumina layer is followed with a layer of magnesium oxide.

However, while there was physicochemical retention improvement for these titanium dioxide pigments in addition to suitable lightfastness (light stability) and zeta potential, a problem with these pigments, especially those with a layer of magnesium oxide, was the use of large concentrations (90-94.3% by weight) of titanium dioxide to make the pigment (see col. 4, lines 31-35 of the '466 patent)

In addition to high concentrations of $TiO_2$ (90-94.3% by weight in the preferred embodiment) in said pigment examples, it has also been observed that these pigment examples perform no better than current décor paper laminate pigment grades on the market in terms of opacity efficiency. Opacity and opacity efficiency can be differentiated as follows:

Opacity—the degree of opaqueness/hiding power (given by a pigment) in end user application Opacity Efficiency—the degree of opaqueness/hiding power (given by a pigment) as a function of its pigment loading in end user application Admittedly, a pigment that retains well to paper fibers will give the paper improved opacity (because the pigment concentration in the paper is higher). However, if such pigment is heavily flocculated, then the pigment would have a poor opacity efficiency rating in the paper.

A potential solution to this problem is to increase the opacity efficiency of the titanium dioxide pigment by modifying the surface treatment design and increasing the surface area of the pigment.

As such, there is still a need in the art for titanium dioxide pigments for the paper manufacture which can increase opacity efficiency, but retain suitable pigment retention. With the titanium dioxide pigment described herein, (décor) paper users will benefit from a pigment that disperses more evenly across the paper fiber which results in obtaining the same opacity performance in the user's paper while using (up to and exceeding) 10% less pigment when compared to use of market leading décor paper laminate pigment grades currently available.

Moreover, these pigments are also useful in providing greater sustainability and making paper manufacturing more environmentally friendly by permitting those of skill in the art to use less titanium dioxide to make the titanium dioxide pigment and/or use less titanium dioxide pigment for end use compositions to achieve the same effect as previously known titanium dioxide pigments.

SUMMARY

Surprisingly, it has been discovered that a unique titanium dioxide treatment process can produce titanium dioxide pigments with enhanced opacity efficiency and higher surface area.

In one aspect, this disclosure provides for a process for making the titanium dioxide pigment of the invention which comprises providing a titanium dioxide suspension, a first treatment step comprising subjecting the titanium dioxide from said suspension to soluble alumina salts and phosphoric acid to form an aluminium phosphate layer, a second treatment step comprising subjecting the titanium dioxide from the first treatment step to a multiple-step alumina surface treatment to form an alumina layer, a third optional treatment step comprising subjecting the titanium dioxide from the second treatment step to soluble magnesium salts to form a MgO layer.

In another aspect, this disclosure provides for a titanium dioxide pigment with lower titanium dioxide content (as a result of the new surface process) which maximizes opacity efficiency and yields a pigment with a significantly higher surface area.

In a further aspect, this disclosure provides for a titanium dioxide pigment of the invention suitable for paper and laminate use.

In still another aspect, this disclosure provides for a method of paper manufacture comprising adding the titanium dioxide pigment of this disclosure to a cellulose slurry.

BRIEF DESCRIPTION OF THE DRAWINGS

FIG. 1 depicts a basic representation of the layering on top of the titanium dioxide surface.

FIG. 7 displays SEM (scanning electron microscopy) cross sectional images of paper pigmented with the product of Example 1 vs. Benchmark Comparative.

DETAILED DESCRIPTION

Figure 2:
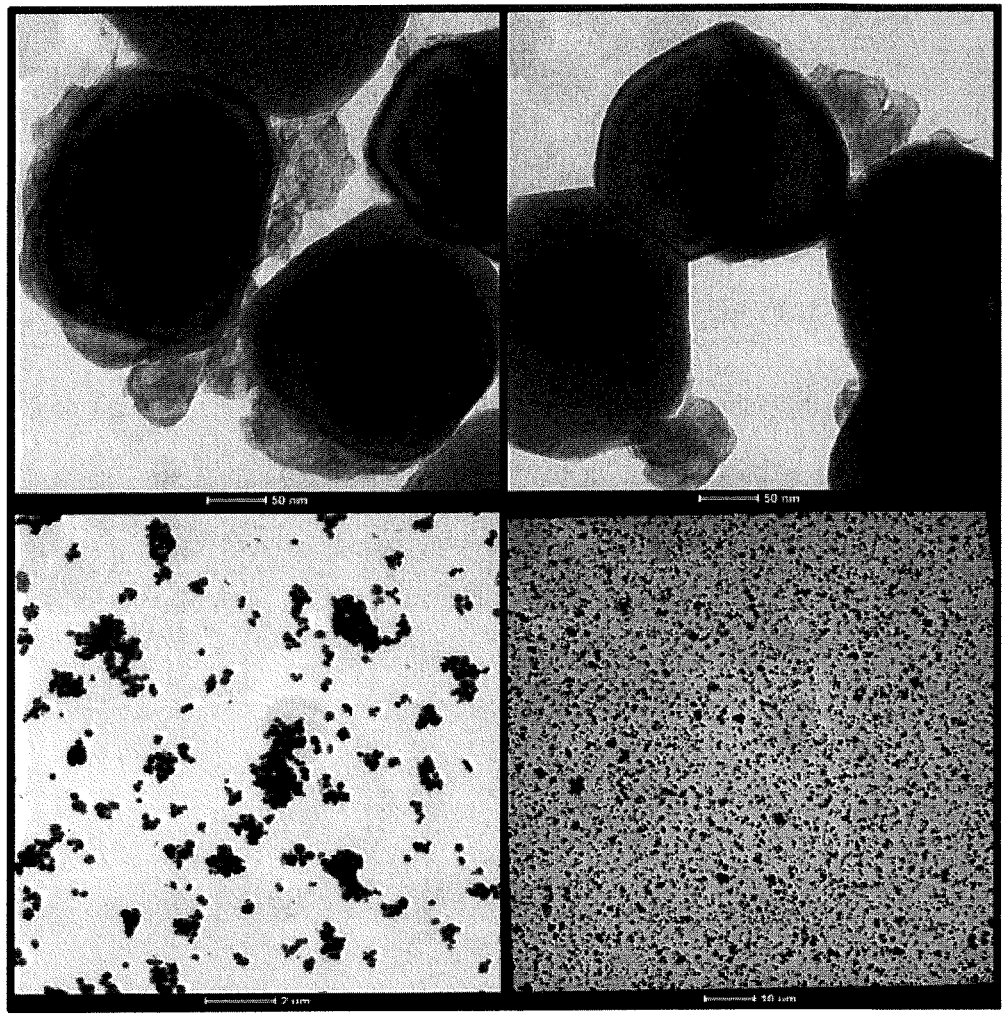
FIG. 2 is a TEM (transmission electron microscopy) image of the product of Comparative Example 1 made in accordance with U.S. Pat. No. 5,665,466 and also the dispersion pattern on the TEM grid.

The present disclosure may be understood more readily by reference to this detailed description. Numerous specific details are set forth in order to provide a thorough understanding of the embodiments described herein. However, it will be understood by those of ordinary skill in the art that the embodiments described herein can be practiced without these specific details. The description is not to be considered as limiting the scope of the embodiments described herein.

In this disclosure, references to % by weight refer to % by weight of the total composition unless otherwise indicated.

This disclosure relates to a process for the surface treatment of a titanium dioxide pigment, characterized by the following sequential steps: a first step of precipitating a layer of aluminium phosphate, followed by a second step of precipitating a layer of alumina which comprises of multiple additional steps, and followed by a third optional step of precipitating a layer of magnesium oxide.

Also, this disclosure relates to a titanium dioxide pigment comprising a titanium dioxide core coated successively with a layer of alumina phosphate, then with a layer of alumina and then optionally with an optional layer of magnesium oxide. The pigment comprises from about 80% to less than 90% by weight of titanium dioxide, has a BET surface area greater than 15 m$^2$/g.

Further, this disclosure relates to the use, in paper manufacture or in the manufacture of paper laminate, of the above pigment or of those obtained by the processes described above.

The pigment as defined herein or obtained by one of the processes described herein is of high physicochemical retention. Generally, such a pigment makes it possible for the paper to retain good opacity. In addition, it usually has good light-fastness.

In accordance with the above, the process for the surface treatment of a titanium dioxide pigment is characterized in that it comprises the following steps in the following order:
  forming an aqueous suspension of titanium dioxide pigments;
  precipitating a layer of alumina phosphate on the surface of the pigments;
  precipitating a layer of alumina over the layer of alumina phosphate, wherein the precipitating of the layer of alumina comprises the steps in the following order:
    (i) adding a first alumina source to the aqueous suspension;
    (ii) adding a second alumina source to the aqueous suspension, wherein the second alumina source is different from the first alumina source; and
    (iii) adding a third alumina source to the aqueous suspension; and
  recovering the titanium dioxide pigments from the suspension.

The treatment thus comprises first coating a titanium dioxide suspension with an aluminium phosphate precipitate at the titanium dioxide particle surface, which is then coated with alumina designed to provide a high surface area form (displaying evidence of boehmite or pseudoboehmite). The alumina coating is performed in multiple additional steps. After these coatings, a magnesium compound can be incorporated at the surface of the treated titanium dioxide compound.

After coating with the alumina layer or after incorporation of the magnesium compound (if used), the treated particles are recovered and the salts are removed through a pH controlled washing process intended to produce a neutral pH pigment product. Optional post washing steps include incorporating an additive such as nitrate salts and/or drying and milling/micronizing the pigment product. The pigment product may be in powder or slurry form.

In the first step of forming the titanium dioxide suspension, the suspension broadly can have a concentration of titanium dioxide in a range of from 100 g/l to 500 g/l, and more typically, the concentration of titanium dioxide is in a range of 300-500 g/l.

This dispersion may optionally contain a dispersing agent so as to disperse and stabilize it. It may be obtained in particular by grinding a dispersion of titanium dioxide using the said dispersing agent. The dispersing agent may be chosen from the following products: 2-amino-2-methyl-1-propanol, potassium or sodium tetrapyrophosphate, potassium or sodium hexametaphosphate, or alkali metal salts of polyacrylic acid polymer or copolymer, such as the ammonium or sodium salt of polyacrylic acid. When phosphate-based compounds are used, they are generally present in a concentration of the order of from 0.1 to 0.5% by weight, expressed as $P_2O_5$, relative to the weight of the titanium dioxide.

The surface treatment process is generally carried out at a temperature above 60° C., and more typically, in a range of 60-90° C. This temperature is maintained throughout the treatment.

The next step of the treatment consists in depositing a layer of alumina phosphate on the surface of the pigment by precipitation. Here and throughout the description, the term alumina phosphate refers to an aluminium phosphorus oxyhydroxide compound. More particularly, this aluminium phosphorus oxyhydroxide precipitated on the surface of the titanium dioxide pigment according to the invention may be defined as being obtainable by precipitation under the operating conditions described below.

Usually, this first layer of alumina phosphate is precipitated from a phosphorus compound and an aluminium salt, in particular in the form of a solution. Advantageously, the phosphorus compound and then the aluminium salt are introduced successively into the aqueous suspension of titanium dioxide pigments. For example, by adding a source of phosphate to the titanium dioxide suspension, and then adding an aluminum salt, which may be by two or more altering steps.

As regards the amount of aluminium salt introduced during the first step, this amount is preferably between 0.5 and 3% expressed as weight of $Al_2O_3$, relative to the weight of the titanium dioxide. The aluminium salts can be selected—for example—from aluminium salts in the group consisting of aluminium sulfate ($Al_2(SO_4)_3$; sodium aluminate ($NaAlO_2$), aluminium chloride ($AlCl_3$) and combinations thereof.

As regards the phosphorus compound or phosphorous source used in the first precipitation step, it may be introduced more particularly in an amount of at least 0.5% by weight of $P_2O_5$ relative to the weight of the titanium dioxide, and more particularly between 0.5 and 5%. Preferably, between 1% and 4% thereof may be introduced. The sources of phosphate, for example, can be selected from the group consisting of phosphoric acid, sodium salts of hexametaphosphate, potassium salts of hexametaphosphate, sodium salt of tetrapyrophosphate, potassium salts of tetrapyrophosphate and combinations thereof.

Typically, the amounts of aluminium salt and of phosphorus compound which are introduced are modified so as to precipitate a layer of alumina phosphate having a P/Al molar ratio of not more than 2. If a phosphate-based dispersing agent has been used to stabilize the starting titanium dioxide dispersion, the amount of phosphate provided by the dispersing agent is subtracted from the amount of phosphate introduced during the first precipitation step.

In general, the first precipitation step takes place at a pH which is suitable to precipitate the alumina phosphate as described above. This pH may be between 4 and 8. However, the first precipitation step is usually carried out at an acidic pH, preferably at a pH of not more than 6. This pH may more preferably be between 4 and 6.

The pH is controlled by the addition of phosphoric acid and/or of another acid such as sulphuric acid or hydrochloric acid. It may also be controlled by the simultaneous and/or alternate introduction of the phosphorus-based compound and the aluminium salt which together will form the alumina phosphate precipitate. This is the case, for example, when phosphoric acid and sodium aluminate are used during this first precipitation.

The next step of the treatment consists in depositing a layer of alumina over the layer of alumina phosphate. Here and throughout the description, the expression layer of alumina refers to a precipitate of an aluminium oxide and/or of an aluminium oxyhydroxide. Usually, this second layer is precipitated using an aluminium salt such as those defined for the precipitation of the first layer. The alumina may be in hydrated form (e.g. aluminium hydrate/aluminium hydroxide).

This second precipitation step comprises subjecting the titanium dioxide from the first precipitation step to a multiple-step alumina surface treatment to form an alumina layer. Preferably, the multiple-step alumina surface treatment utilizes at least two different alumina sources. For example, the following can be added in sequence to the titanium dioxide suspension after application of the aluminium phosphate first layer:

(i) $Al_2O_3$ from an alumina source;
(ii) $Al_2O_3$ from a different alumina source than in step (i); and
(iii) $Al_2O_3$ from one or more alumina source from step (i) or (ii).

Thus, the second precipitation step can comprise three or more sub-steps of adding alumina sources to the titanium dioxide suspension obtained from the first precipitation step.

Generally, the first alumina source and second alumina source will both be an aluminium salt and can, for example, be selected from aluminium salts in the group consisting of aluminium sulfate ($Al_2(SO_4)_3$; sodium aluminate ($NaAlO_2$), aluminium chloride ($AlCl_3$) and combinations thereof. Typically, the selection of aluminium source will be with the restriction that the second alumina source is different than the first alumina source. More typically, they will have no overlapping aluminium salt components. Thus, if the first alumina source is aluminium sulfate, the second aluminium source can be sodium aluminate, aluminium chloride or a combination of the two but would not contain aluminium sulfate.

While it is within the scope of this disclosure for the third application of alumina (third sub-step) to have a different alumina source than either the first alumina source or second alumina source, more typically, the third application will use the same alumina source as either the first alumina source or the second alumina source. Additionally, it is within the scope of this disclosure for there to be subsequent applications of alumina following the third application of alumina in the above sub-step (iii).

The amount of alumina source introduced in the above sub-steps (i), (ii) and (iii), and any subsequent applications of alumina, can be from 0.5 to 5%, or from 1 to 4%, expressed as weight of $Al_2O_3$, relative to the weight of the titanium dioxide.

The precipitation in the sub-steps takes place at the pH required to precipitate the layer of alumina. Generally, this pH may be between 3 and 10, but can be 7 and 10. For example, the adjustment may be made by adding sulphuric acid.

The three or more alumina depositing sub-steps (steps (i), (ii) and (iii), above) are each typically followed by a maturation step or maturation time. These maturation steps generally comprise stirring the reaction medium obtained after introduction of an alumina source without further introduction of an alumina source for a period of time. The period of time or "maturation time" is generally 1 minute or more, or 3 minutes or more. Typically, the "maturation time" is from about 2 to about 10 minutes, from about 3 to about 7 minutes, or from 4 to 6 minutes after each alumina depositing sub-steps.

Additionally, maturation steps may be carried out after each precipitation step; that is, a maturation time can be used after the first precipitation step (introduction of phosphorous compounds and aluminium salts) and after the second precipitation step (after all the alumina deposition steps have been carried out). These maturation steps comprise stirring the reaction medium obtained after introduction of all the phosphorus compounds and the aluminium salts involved in the first precipitation step, and in introducing all the aluminium salt involved in the second precipitation step. The maturation time after the first precipitation step and second precipitation step is generally of the order of from 5 to 30 min in each step.

After these two precipitation steps, the treated pigments can be separated from the liquid phase of the suspension by any known means, and the pigment can be washed with water, dried and micronized. However, more typically after the first and second precipitation steps, magnesium oxide (MgO) from a magnesium source is deposited on the layer of alumina while maintaining pH, generally with a base. Here and throughout the description, the term magnesium oxide refers to a magnesium oxide and/or hydroxide. This is usually magnesium dihydroxide.

The magnesium compound may be selected from the group consisting of magnesium hydroxide, magnesium oxide, magnesium silicate, magnesium phosphate, magnesium aluminate, magnesium carbonate and combinations thereof.

The amount of magnesium salt introduced is generally greater than 0.01% by weight of MgO relative to the weight of the titanium dioxide, and can be in the range of 0.05% to 4%, or 0.1% to 3%.

This precipitation may be carried out at a pH which is suitable to precipitate the layer of magnesium oxide. This pH is usually from 5 to 9, and preferably from 7 to 9, or from 7 to 8.5. It may be adjusted by solutions of NaOH, KOH or $Na_2CO_3$, or may be adjusted by adding an alumina source.

This MgO latter precipitation may be followed by a step of maturation. The maturation time is generally of the order of from 5 to 30 min.

Following these MgO precipitation steps, the treated pigments are separated from the liquid phase of the suspension by any known means. The post treatment steps after adding the magnesium oxide third layer can include, but is not limited to, a pH adjustment after the MgO layer is added, filter washing the layered titanium dioxide suspension, reslurrying the cake containing the layered titanium dioxide and adjusting the pH of the slurry, dewatering the slurry, addition of a nitrate salt, a drying step, followed by a micronizing step to obtain the final titanium dioxide pigment product.

The above described processes result in a titanium dioxide pigment containing from 80% to 90% by weight of titanium dioxide, and more typically, from 81% to 88% or from 84% to 88% by weight titanium dioxide. The resulting pigment can have from 1% to 4%, or from 2% to 3% by weight of $P_2O5$. Additionally, the resulting pigment can have from 6% to 10% or from 7% to 9% by weight of analyzed alumina, which can be made up of but not limited to alumina from the aluminium phosphate component and alumina from the second precipitation step. Optionally, the resulting pigment can have more than 0.01% by weight of MgO, but more typically can have from 0.05% to 4.0%, from 0.1% to 3%, from 0.1% to 2.9%, or from 0.1% to 1.75% by weight of MgO. Generally, the resulting pigment will have a BET surface area greater than 15 $m^2/g$, and generally, less than or equal to 40 $m^2/g$. More typically, the BET surface area can be from 18 $m^2/g$ to 40 $m^2/g$ from 20 $m^2/g$ to 40 $m^2/g$, from 22 $m^2/g$ to 35 $m^2/g$, from 28 $m^2/g$ to 33 $m^2/g$ or from 18 $m^2/g$ to 24 $m^2/g$. In some cases, the titanium dioxide pigment will include other components, which are not $TiO_2$, $P_2O_5$, $Al_2O_3$, or MgO. For example, such other components can include associated hydration or moisture, inorganic oxides (other than the primary components), ions (such as sodium, potassium, nitrate, chloride, sulphate, etc.), trace metals and organic additives.

For example, in one embodiment of the invention, the titanium dioxide pigment comprises:
- 80-90% by weight titanium dioxide;
- 1-4% by weight of $P_2O5$;
- 6-10% by weight of analyzed alumina (which can be made up of but not limited to, alumina deposited at base pigment production, alumina from the aluminium phosphate component and alumina from the second alumina stage); and
- optionally 0.05-4.0/o by weight magnesium oxide,
- wherein the pigment has a BET surface area greater than 15 $m^2/g$.

In another embodiment of the invention, the titanium dioxide pigment comprises:
- 81-88% by weight titanium dioxide;
- 2-3% by weight of $P_2O5$;
- 7-9% by weight of analyzed alumina (which can be made up of but not limited to, alumina deposited at base pigment production, alumina from the aluminium phosphate component and alumina from the second alumina stage); and
- optionally 0.1-2.9% by weight magnesium oxide,
- wherein the pigment has a BET surface area from 15 $m^2/g$ to 40 $m^2/g$, or from 20 $m^2/g$ to 40 $m^2/g$.

In another embodiment of the invention, the titanium dioxide pigment comprises:
- 81-88% by weight titanium dioxide;
- 2-3% by weight of $P_2O_5$;
- 7-9% by weight of analyzed alumina (which can be made up of but not limited to, alumina deposited at base pigment production, alumina from the aluminium phosphate component and alumina from the second alumina stage); and
- 0.1-1.75% by weight magnesium oxide,
- wherein the pigment has a BET surface area from 15 $m^2/g$ to 35 $m^2/g$, or from 22 $m^2/g$ to 35 $m^2/g$.

In another embodiment of the invention, the titanium dioxide pigment comprises:
- 84-88% by weight titanium dioxide;
- 2-3% by weight of $P_2O5$;
- 7-9% by weight of analyzed alumina (which can be made up of but not limited to, alumina deposited at base pigment production, alumina from the aluminium phosphate component and alumina from the second alumina stage); and
- 0.1-1.75% by weight magnesium oxide,
- wherein the pigment has a BET surface area from 18 $m^2/g$ to 33 $m^2/g$, or from 28 $m^2/g$ to 33 $m^2/g$.

The pigments of this disclosure can be incorporated into compositions in the form of a slurry, suspension or dispersion.

In other embodiments, the current pigments are used in the production of paper or paper laminates. Any process of paper production (or of paper formulation) known to those skilled in the art may be employed. The paper is usually prepared from a mixture of water, cellulose fibers and a pigment according to this disclosure or one which is obtained according to processes of this disclosure. Optionally, the paper is prepared in the presence of an agent for improving the wet strength. The agent can comprise, for example, a quaternary ammonium salt of epichlorohydrin-based polymers (for example epichlorohydrin/dimethylamine polymers).

Embodiments also relate to the use of the pigment, as described above or obtained according to the processes described above, in the production of paper laminates based on paper containing the said pigment and at least one resin (in particular a melamine or melamine-formaldehyde resin). Any paper laminate production process known to those skilled in the art may be employed (using a paper pigmented with the pigment according to this disclosure) in order to prepare the laminates. The invention is not limited to one specific production process. Thus, for example, the pigmented paper may be impregnated with an aqueous-alcoholic solution of resin, after which several sheets of pigmented paper impregnated with resin are laminated by hot-pressing techniques. The pigmented paper may contain an agent for improving the wet strength.

Thus, in embodiments, the pigment can also be used to coat paper and/or laminates.

The following examples further describe and demonstrate illustrative embodiments within the scope of the present invention. The examples are given solely for illustration and are not to be construed as limitations of this invention as many variations are possible without departing from the spirit and scope thereof. Various modifications of the invention in addition to those shown and described herein should be apparent to those skilled in the art and are intended to fall within the appended claims.

EXAMPLES

In the following Examples, the comparative examples are not necessarily based upon the prior art. In some cases, the comparative examples use alternative techniques so as to better exemplify and compare with the current processes and products.

Example 1—Surface treatment of titanium dioxide according to this disclosure

A titanium dioxide suspension with a concentration of 400 g/L was provided and maintained at 70° C.

An aluminium phosphate first layer was deposited on the titanium dioxide by adding the following to the titanium dioxide suspension:
 (i) 1.2% by weight $Al_2O_3$ (alumina) from $NaAlO_2$ (sodium aluminate); and
 (ii) 1.5% by weight $P_2O5$ (phosphorus pentoxide) from $H_3PO_4$ (phosphoric acid).

An alumina second layer was deposited by adding the following in sequence to the titanium dioxide suspension after application of the aluminium phosphate first layer:
 (i) 1% by weight $Al_2O_3$ from $Al_2(SO_4)_3$ (aluminium sulfate) and retained for 5 minutes;
 (ii) 1% by weight $Al_2O_3$ from $NaAlO_2$ and retained for 5 minutes; and
 (iii) 3.5% by weight $Al_2O_3$ from $NaAlO_2$ maintained at pH 8.5 and then retained for 5 minutes.

A magnesium oxide third layer was added to the titanium dioxide suspension after application of the alumina second layer, by adding 0.75% by weight MgO (magnesium oxide) from $MgSO_4 \cdot 7H_2O$ while maintaining pH at 8.5 with NaOH and then retained for greater than 15 minutes.

Post treatment steps included adjusting the pH to 6.7, filter washing the treated suspension, reslurrying the cake to 400 g/L and adjusting the pH to 6.0 with HCl, de-watering, blending 0.13% $KNO_3$ prior to drying, a drying step followed by a crushing and micronizing step to obtain the final titanium dioxide pigment product.

Comparative Example 1—titanium dioxide pigment made from a process in accordance with Example 1 from U.S. Pat. No. 5,665,466.

A titanium dioxide suspension with a concentration of 350 g/L was provided and maintained at a temperature of 60° C.

An aluminium phosphate first layer was deposited on the titanium dioxide by adding the following to the titanium dioxide suspension:
 (i) 2.5% by weight of $P_2O5$ in the form of a phosphoric acid solution; and
 (ii) 1% by weight of $Al_2O_3$ in the form of a sodium aluminate solution. These additions were performed over 10 min. The pH is adjusted, during the precipitation and at the end of the addition, by adding sulfuric acid, to between 4.8 and 5.2 and retained for 30 minutes.

To the dispersion with an aluminium-phosphate first layer described above was added 3.5% by weight of $Al_2O_3$ in the form of a sodium aluminate solution. This addition was performed over 10 min. During this addition, the pH was maintained at between 7 and 7.5 by adding sulfuric acid.

Post treatment steps included filtering the dispersion, washed with water at 45° C., drying at 150° C. for 15 hours and micronizing to form the titanium dioxide pigment.

Comparative Example 2—titanium dioxide pigment made from a process in accordance with Example 2 from U.S. Pat. No. 5,665,466.

A titanium dioxide suspension with a concentration of 350 g/L was provided and maintained at a temperature of 80° C.

An aluminium phosphate first layer was deposited on the titanium dioxide by adding the following to the titanium dioxide suspension:
 (i) 2.5% by weight of $P_2O_5$ in the form of a phosphoric acid solution; and
 (ii) 1% by weight of $Al_2O_3$ in the form of a sodium aluminate solution.

The pH was lowered to 5 by adding phosphoric acid, and is then adjusted to between 4.8 and 5.2 by simultaneously adding sodium aluminate or phosphoric acid. At the end of the addition, the pH is controlled by adding sulfuric acid. The additions are performed over 10 min. Following this, the reaction mixture is kept stirring for 30 min.

To the dispersion with the aluminium phosphate first layer described above was added 3.5% by weight of $Al_2O_3$ in the form of sodium aluminate. The pH rose to 7 on adding sodium aluminate, and was then controlled by simultaneously adding sodium aluminate and sulfuric acid in order to retain this pH of 7. These additions were performed over 10 min. Following this, the reaction mixture is kept stirring for 15 min.

To the dispersion with the alumina second layer described above was added 0.5% by weight of MgO in the form of magnesium sulfate. The pH was adjusted to between 7 and 8 by simultaneously adding magnesium sulfate and a potassium hydroxide solution. Following this, the reaction mixture was kept stirring for 15 min.

Post treatment steps included filtering the dispersion, washed with water at 45° C., drying at 150° C. for 15 hours and micronizing to form the titanium dioxide pigment. No silica was added during the process.

Comparative Example 3—A comparative example was made based upon the teachings of the '466 patent, but to produce a titanium dioxide pigment which contains 83.5% by weight titanium dioxide, 3.66% by weight aluminium phosphate, 3.40% by weight alumina and 0.90% by weight magnesium oxide.

The process of making the pigment for Comparative Example 3 included:
 providing a titanium dioxide suspension with a concentration of 400 g/L maintained at 70° C.;
 adding an aluminium phosphate layer by treating with 4.5% by weight $AlPO_4$;
 followed by adding an alumina layer by adding 3.80% by weight of alumina (half sourced from aluminium sulfate and the other half sourced from sodium aluminate); and
 followed by a step of adding 1.5% by weight of magnesium oxide.

Comparative Example 4

The process of Comparative Example 3 was repeated with the exception that the amount of magnesium oxide added was increased to 2.1% by weight. The resulting titanium dioxide pigment contained 83.5% by weight titanium dioxide, 3.66% by weight aluminium phosphate, 3.40% by weight alumina and 2.10% by weight magnesium oxide.

Benchmark Comparative

A commercially sold product was used as the Benchmark Comparative. At the time the examples were conducted, this product was sold by The National Titanium Dioxide Co., Ltd. ("Cristal") as RCL-722. The product for the Benchmark Comparative was produced under general process conditions related to Comparative Example 1 and as also referred to in the '466 patent and were claimed in a divisional application (U.S. Pat. No. 5,942,281). The Benchmark Comparative pigment was a titanium dioxide pigment which contains 89.2% by weight titanium dioxide, 3.80% by weight aluminium phosphate and 3.01% by weight added alumina (no magnesium oxide).

Comparison of Example 1. Comparative Examples 1-4 and Benchmark Comparative

Table 1 below is a compilation of the characteristics of the titanium dioxide pigments produced in the above examples illustrating the difference in pigment characteristics among Example 1, Comparative Examples 1-4 and the Benchmark Comparative.

Referring back to Table 1, Example 1 gave the best opacity efficiency rating and was able to employ more $Al_2O_3$ (and a high surface area form)—but still contained some magnesium oxide. Increasing the MgO in the comparisons—for example Comparative Example 3 vs. Comparative Example 4—also improved opacity efficiency but not to the extent achieved by Example 1, and none of the comparisons had the BET specific surface areas equivalent to Example 1. The two best performing pigments (Example 1 and Comparative Example 4) respectively had the two highest BET specific surface areas, but again, the BET specific surface area of Comparative Example 4 was less than that of Example 1.

TABLE 1

| Example | % $AlPO_4$ | % added $Al_2O_3$ | % MgO | % $TiO_2$* | BET Surface Area $m^2/g$ | % Opacity Efficiency Improvement vs. Benchmark |
|---|---|---|---|---|---|---|
| Example 1 | 2.38 | 5.66 | 0.22 | 87.0 | 32.2 | 9.7 |
| Comp. Ex. 1 | 3.47 | 3.80 | 0.06 | 88.4 | 9.5 | 0.4 |
| Comp. Ex. 2 | 3.40 | 3.71 | 0.19 | 88.2 | 11.4 | 1.4 |
| Comp. Ex. 3 | 3.66 | 3.40 | 0.90 | 83.5 | 14.7 | 1.2 |
| Comp. Ex. 4 | 3.66 | 3.40 | 2.10 | 83.5 | 21.1 | 5.1 |
| Benchmark Comparative | 3.80 | 3.01 | 0.00 | 89.2 | 9.7 | 0 |

*Variations in the amounts between the comparative examples and those reported in U.S. Pat. No. 5,665,466 are due to hydration on the surface of the treated titanium dioxide particles, hydration associated with the surface treatment and purity of the raw titanium dioxide pigments. For better comparison here, these factors have been accounted for in the same way between the examples and comparative examples.

Figure 5:
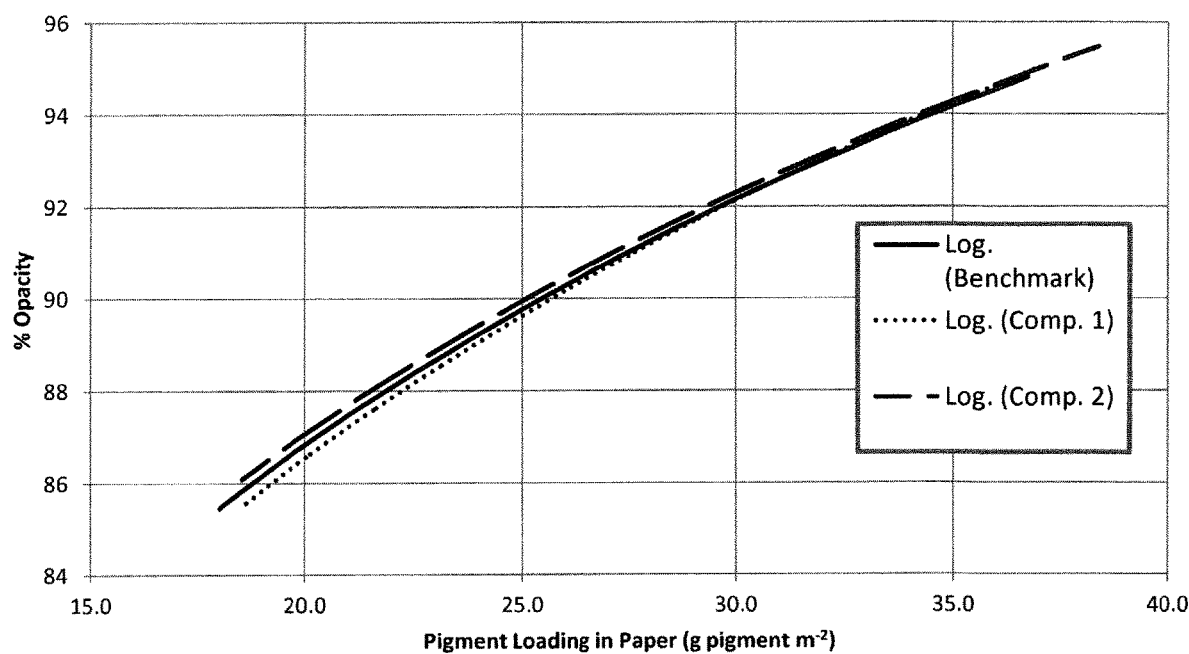
FIG. 5 displays opacity efficiency curves comparing Comparative Examples 1 and 2 vs. Benchmark Comparative.

The evidence in Table 1 suggests that Comparative Examples 1 and 2 are practically similar to the industry benchmark in terms of % Opacity Efficiency Improvement. This statement is backed up in FIG. 5 which displays the opacity efficiency curves (% Opacity vs. Pigment Loading in paper $g/m^2$) for the three examples in question. The opacity efficiency curves disclosed in FIG. 5 show the similarity between Comparative Examples 1 and 2 with the results from the Benchmark Comparative. All three of these have similar opacity efficiency curves.

Figure 6:
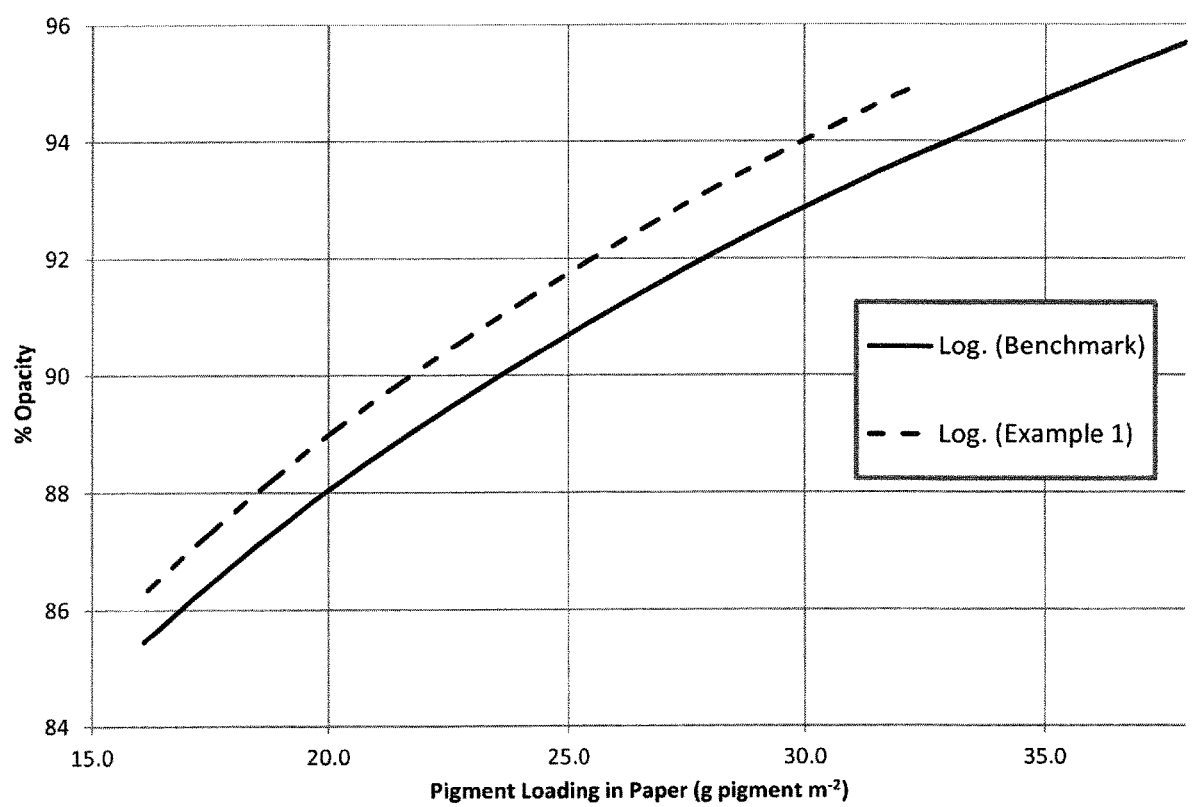
FIG. 6 displays opacity efficiency curves comparing the product of Example 1 vs. Benchmark Comparative.

Example 1 however, gave a 9.1% opacity efficiency improvement vs. the Benchmark Comparative. This means that the same opacity rating for paper using the Benchmark Comparative pigment could be achieved by 9.1% less of the pigment of Example 1. This statement is supported by FIG. 6, which displays the opacity efficiency curves (% Opacity vs. Pigment Loading in paper $g/m^2$) for the two examples in question. (It should be noted, that variations in the Benchmark data between FIG. 5 and FIG. 6 represent slight variations in the test conditions caused by obtaining the data for FIG. 5 on a different day than FIG. 6. Accordingly, the results are reported in tables 1 and 3 as % Opacity Efficiency Improvement of the example or comparative example over the Benchmark in order to better compare the % Opacity Efficiency Improvement.)

Furthermore, Scanning Electron Microscopy (SEM) cross-sectional images of papers pigmented with the pigment of Example 1 and the pigment of the Benchmark Comparative are shown (at equivalent pigment $g/m^2$) in FIG. 7. Visual assessment of the papers suggested that the agglomeration of pigment was worse in the paper pigmented with the benchmark example, with assorted large/heavy agglomerates, up to 100 μm, evident throughout the width of the sample. Paper pigmented with Example 1 displayed a good distribution of pigment throughout the full width of the sample.

Figure 3:
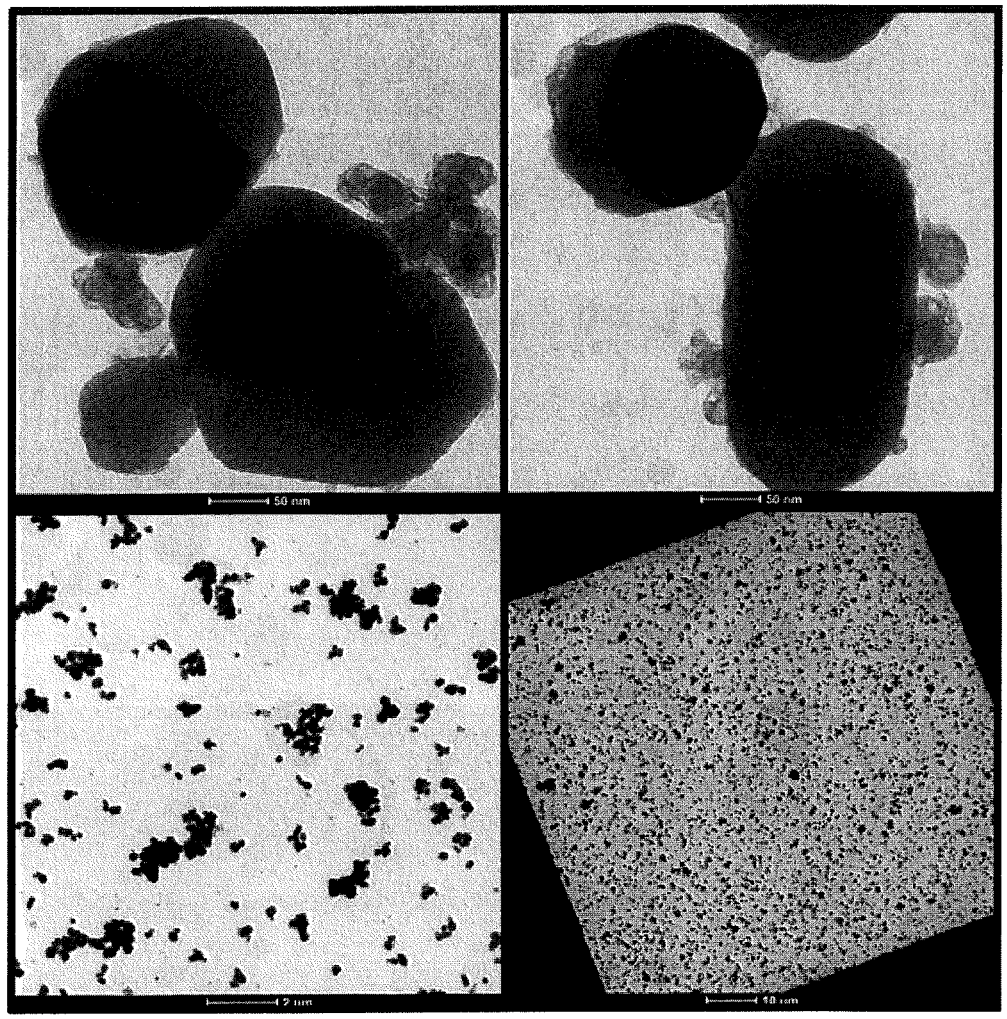
FIG. 3 is a TEM image of the product of Comparative Example 2 made in accordance with U.S. Pat. No. 5,665,466 and also the dispersion pattern on the TEM grid.
Figure 4:
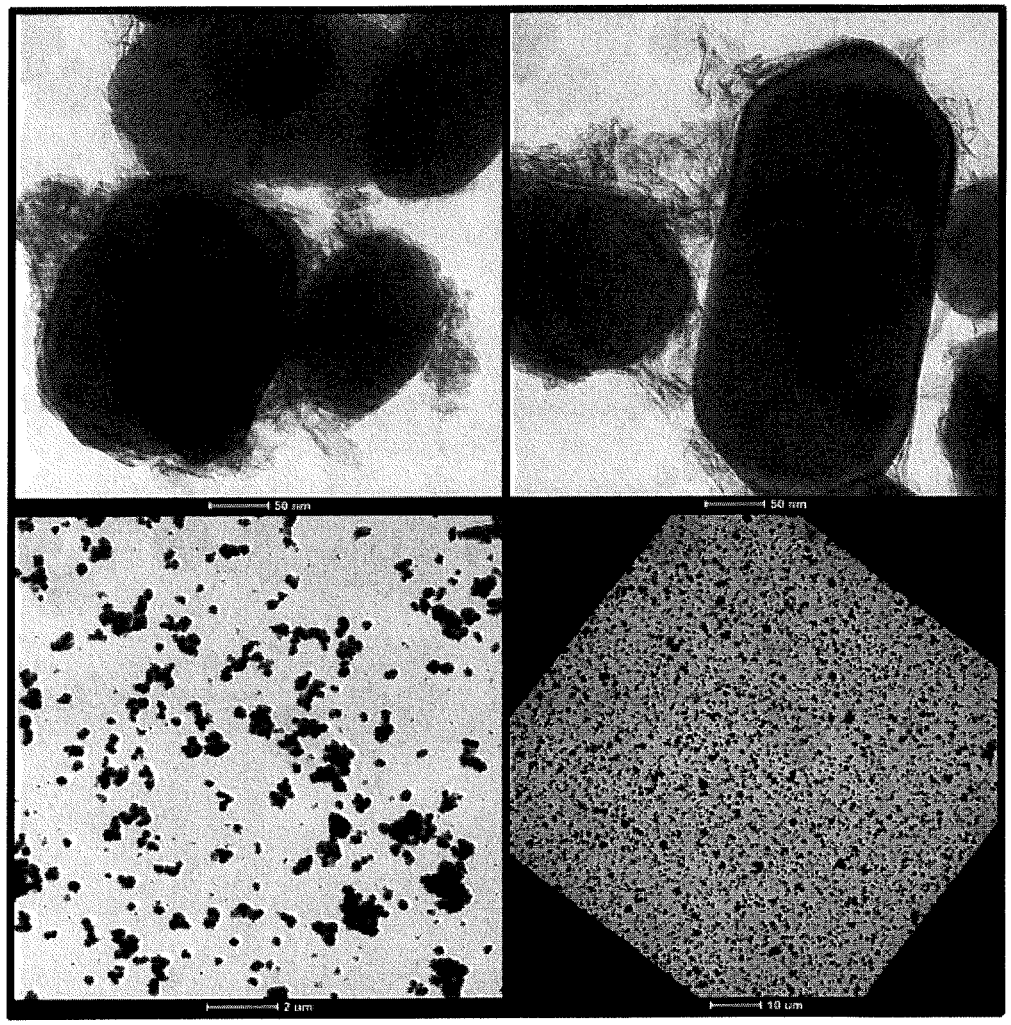
FIG. 4 is a TEM image of the product made in Example 1 of this application in accordance with an embodiment of the invention.

While not wishing to be bound by theory, it is believed that the multi-step process for applying the alumina second layer led to the greater surface area. The net result of this difference in application can be seen by comparing the TEM images of FIGS. 2 and 3 vs. FIG. 4. The "meshy" area around the surface of the pigment in the top half of the TEM images in FIG. 4 contributes to the enhanced surface area as compared to the surfaces seen in the top half of the TEM images in FIGS. 2 and 3 which were prepared with a single step alumina surface treatment.

The enhanced surface area was particularly surprising when looking at the surface areas of comparable state of the art commercially-available laminate-grade pigments—see Table 2 below:

TABLE 2

| Sample | BET Surface Area ($m^2/g$) |
|---|---|
| Kronos ® 2800 | 9.6 |
| Tronox ® 8120 | 9.8 |
| Chemours ® R-796+ | 7.4 |
| Lomon ® LR-952 | 7.3 |
| Sachtleben ® R610L | 8.1 |
| Example 1 | 34.3 |

An unexpected improvement in dispersion efficiency means that despite using less titanium dioxide, Example 1 was still able to show better opacity efficiency relative to a benchmark standard.

Example 2

The process described in Example 1 was repeated up to the end of the aluminium-phosphate first layer. Subsequently, the following was added in sequence to the titanium dioxide suspension after application of the aluminium phosphate first layer:

(i) 1% by weight $Al_2O_3$ from $Al_2(SO_4)_3$ (aluminium sulfate) and retained for 5 minutes;

(ii) 1% by weight $Al_2O_3$ from $NaAlO_2$ and retained for 5 minutes; and (iii) 3.5% by weight $Al_2O_3$ from $NaAlO_2$ maintained at pH 8.5 and then retained for 5 minutes.

No magnesium compound was added as a third layer. The post treatment steps were followed similar to those described in Example 1.

Example 3

The process described in Example 1 was repeated except that the alumina layer step was modified to having the following added in sequence to the titanium dioxide suspension after application of the aluminium phosphate first layer:

(i) 2% by weight $Al_2O_3$ from $Al_2(SO_4)_3$ (aluminium sulfate) and retained for 5 minutes;

(ii) 2% by weight $Al_2O_3$ from $NaAlO_2$ and retained for 5 minutes; and (iii) 1.5% by weight $Al_2O_3$ from $NaAlO_2$ maintained at pH 8.5 and then retained for 5 minutes.

Example 4

The process described in Example 1 was repeated except that the alumina second layer step comprised only adding 5.5% by weight $Al_2O_3$ from NaAlO2 (sodium aluminate) with the pH being maintained at 8.5 with HCl and then retained for 5 minutes.

Example 5

The process described in Example 1 was repeated except that the magnesium oxide third layer step was modified so the analyzed content was 0.90% by weight MgO (magnesium oxide) from $MgSO_4 \cdot 7H_2O$ while maintaining pH at 8.5 with NaOH and then retained for greater than 15 minutes.

Example 6

The process described in Example 1 was repeated except that the magnesium oxide third layer step was modified so the analyzed content was 1.64% by weight MgO (magnesium oxide) from $MgSO_4 \cdot 7H_2O$ while maintaining pH at 8.5 with NaOH and then retained for greater than 15 minutes.

Example 7

The process described in Example 1 was repeated except that the magnesium oxide third layer step was modified so the analyzed content was 2.53% by weight MgO (magnesium oxide) from $MgSO_4 \cdot 7H_2O$ while maintaining pH at 8.5 with NaOH and then retained for greater than 15 minutes.

Example 8

The process described in Example 1 was repeated except that the magnesium oxide third layer step was modified so the analyzed content was 2.81% by weight MgO (magnesium oxide) from $MgSO_4 \cdot 7H_2O$ while maintaining pH at 8.5 with NaOH and then retained for greater than 15 minutes.

Effect on the Amount of MgO on $TiO_2$ Pigment Characteristics

Table 3 below is a compilation of the characteristics of the titanium dioxide pigments produced in the above examples.

TABLE 3

| Example | % AlPO$_4$ | % added Al$_2$O$_3$ | % MgO | % TiO$_2$ | BET Surface Area m$^2$/g | % Opacity Improvement vs. Benchmark |
|---|---|---|---|---|---|---|
| Example 2 | 2.28 | 5.50 | 0 | 87.6 | 30.9 | 6.8 |
| Example 3 | 2.35 | 5.26 | 0.12 | 86.4 | 22.7 | 9.3 |
| Example 1 | 2.38 | 5.66 | 0.22 | 87.0 | 32.2 | 9.7 |
| Example 4 | 2.38 | 5.48 | 0.25 | 87.1 | 31.3 | 9.3 |
| Example 5 | 2.32 | 5.48 | 0.90 | 85.6 | 32.0 | 12.4 |
| Example 6 | 2.24 | 5.18 | 1.64 | 84.1 | 29.8 | 11.0 |
| Example 7 | 2.20 | 5.15 | 2.53 | 82.2 | 28.5 | 9.7 |
| Example 8 | 2.21 | 5.18 | 2.81 | 81.4 | 27.1 | 8.6 |

Modifying the amount of added alumina is a notable feature for the solution to the problem, but the amount of magnesium oxide is also a notable feature of the invention.

Table 3 illustrates that a high surface area $Al_2O_3$ product without MgO performed well with a 6.8% opacity efficiency improvement. This invention is very much novel to the décor paper laminate market (backed up by the surface area data in Table 2 and the differences in TEM images of FIG. 4 vs FIGS. 2 and 3).

However, Table 3 illustrates that a high surface area $Al_2O_3$ product treated with MgO performed better than products without MgO, with magnesium treated examples averaging ~10% opacity efficiency improvement.

While particular embodiments of the invention have been illustrated and described, it will be obvious to those skilled in the art that various changes and modifications may be made without departing from the scope of the invention as defined in the appended claims.

While apparatuses and methods are described in terms of "comprising," "containing," or "including" various components or steps, the apparatuses and methods also can "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Additionally, where the term "about" is used in relation to a range, it generally means plus or minus half the last significant figure of the range value, unless context indicates another definition of "about" applies.

Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A process for the surface treatment of titanium dioxide pigments, comprising the steps in the following order:

(a) forming an aqueous suspension of titanium dioxide pigments;

(b) precipitating a layer of alumina phosphate on the surface of the pigments in said aqueous suspension formed in step (a) to form an aqueous suspension of titanium dioxide pigments having a layer of alumina phosphate precipitated on the surface of the pigments;

(c) precipitating a layer of alumina over the layer of alumina phosphate in said aqueous suspension formed in step (b) to form an aqueous suspension of titanium dioxide pigments having a layer of alumina phosphate precipitated on the surface of the pigments and a layer of alumina precipitated over the layer of alumina phosphate, wherein the precipitating of the layer of alumina over the layer of alumina phosphate comprises the following sub-steps in the following order:

(i) adding a first alumina source to said aqueous suspension formed in step (b) to form an aqueous suspension of titanium dioxide pigments having a layer of alumina phosphate precipitated on the surface of the pigments and alumina precipitated over the layer of alumina phosphate;

(ii) after sub-step (c)(i), allowing said aqueous suspension formed is sub-step (c)(1) to mature for a maturation time;

(iii) after sub-step (c)(ii), adding a second alumina source to said aqueous suspension formed in sub-step (c)(i) to form an aqueous suspension of titanium dioxide pigments having a layer of alumina phosphate precipitated on the surface of the pigments and additional alumina precipitated over the layer of alumina phosphate, wherein the second alumina source is different from the first alumina source;

(iv) after sub-step (c)(iii), allowing said aqueous suspension formed is sub-step (c)(iii) to mature for a maturation time;

(v) after sub-step (c)(iv), adding a third alumina source to said aqueous suspension formed in sub-step (c)(iii) to form an aqueous suspension of titanium dioxide pigments having a layer of alumina phosphate precipitated on the surface of the pigments and additional alumina precipitated over the layer of alumina phosphate; and (vi) after sub-step (c)(v), allowing said aqueous suspension formed in sub-step (c)(v) to mature for a maturation time, wherein said maturation time associated with steps (c)(ii), (c)(iv) and (c)(vi) is from 1 minute to 30 minutes, and wherein the first alumina source, the second alumina source and the third alumina source are each selected from the alumina source group consisting of aluminum sulfate ($Al_2(SO_4)_3$), sodium aluminate ($NaAlO_2$), aluminum chloride ($AlCl_3$) and combinations thereof; and (d) after sub-step (c)(vi), recovering the titanium dioxide pigments from said aqueous suspension formed in step (c)(v).

2. The process of claim 1, wherein the maturation time associated with steps (c)(ii), (c)(iv) and (c)(vi) is from 2 minutes to 10 minutes.

3. The process of claim 1, wherein after step (c) and before step (d) a layer of magnesium oxide is precipitated over the layer of alumina to produce titanium dioxide pigments.

4. The process of claim 1, wherein the second alumina source does not include a member of the alumina-source group that is included in the first alumina source, and wherein the third alumina source includes at least one member of the alumina-source group that is included in the first alumina source or the second alumina source.

* * * * *

UNITED STATES PATENT AND TRADEMARK OFFICE
CERTIFICATE OF CORRECTION

| | |
|---|---|
| PATENT NO. | : 12,110,634 B2 |
| APPLICATION NO. | : 17/253404 |
| DATED | : October 8, 2024 |
| INVENTOR(S) | : Robert McIntyre et al. |

Page 1 of 1

It is certified that error appears in the above-identified patent and that said Letters Patent is hereby corrected as shown below:

In the Specification

Column 7, Line 30: replace "P₂O5" with --$P_2O_5$--

Column 7, Line 53: replace "P₂O5" with --$P_2O_5$--

Column 7, Line 59: replace "0.05-4.0/o" with --0.05-4.0%--

Column 7, Line 65: replace "P₂O5" with --$P_2O_5$--

Column 8, Line 22: replace "P₂O5" with --$P_2O_5$--

Column 9, Line 14: add a --.-- after "disclosure"

Column 9, Line 22: replace "P₂O5" with --$P_2O_5$--

Column 9, Line 52: replace "P₂O5" with --$P_2O_5$--

Signed and Sealed this
Thirteenth Day of May, 2025

Coke Morgan Stewart
*Acting Director of the United States Patent and Trademark Office*